United States Patent
Kulkarni et al.

(10) Patent No.: US 10,979,416 B2
(45) Date of Patent: Apr. 13, 2021

(54) SYSTEM AND METHOD FOR AUTHENTICATION IN A PUBLIC CLOUD

(71) Applicant: NICIRA, INC., Palo Alto, CA (US)

(72) Inventors: Vaibhav Kulkarni, Pune (IN); Narendra Sharma, Pune (IN); Aditya Gokhale, Pune (IN); Ganesan Chandrashekhar, Palo Alto, CA (US); Vivek Agarwal, Palo Alto, CA (US); Akshay Katrekar, Palo Alto, CA (US); Rompicherla Sai Pavan Kumar, Pune (IN)

(73) Assignee: Nicira, Inc., Palo Alto, CA (US)

( * ) Notice: Subject to any disclaimer, the term of this patent is extended or adjusted under 35 U.S.C. 154(b) by 289 days.

(21) Appl. No.: 15/974,710

(22) Filed: May 9, 2018

(65) Prior Publication Data
US 2019/0297072 A1  Sep. 26, 2019

(30) Foreign Application Priority Data
Mar. 26, 2018 (IN) .............................. 201841011023

(51) Int. Cl.
*H04L 29/06* (2006.01)
*H04L 12/66* (2006.01)
(Continued)

(52) U.S. Cl.
CPC .......... *H04L 63/0823* (2013.01); *H04L 12/66* (2013.01); *H04L 63/0272* (2013.01); *H04L 63/062* (2013.01); *H04L 63/10* (2013.01); *H04L 63/20* (2013.01); *H04L 41/044* (2013.01); *H04L 41/18* (2013.01); *H04L 41/22* (2013.01); *H04L 67/10* (2013.01)

(58) Field of Classification Search
CPC ..... H04L 63/20; H04L 63/10; H04L 63/0823; H04L 63/0272; H04L 63/062; H04L 12/66
See application file for complete search history.

(56) References Cited

U.S. PATENT DOCUMENTS

| | | | |
|---|---|---|---|
| 9,106,620 B2 * | 8/2015 | Moore | H04L 63/062 |
| 9,118,487 B1 * | 8/2015 | Robinson | H04L 9/3268 |

(Continued)

OTHER PUBLICATIONS

C. Hegedus, P. Varga and A. Frankó, "Secure and trusted inter-cloud communications in the arrowhead framework," 2018 IEEE Industrial Cyber-Physical Systems (ICPS), St. Petersburg, 2018, pp. 755-760. (Year: 2018).*

(Continued)

*Primary Examiner* — Kari L Schmidt
(74) *Attorney, Agent, or Firm* — Patterson + Sheridan, LLP (57) ABSTRACT

A system and method for managing a trusted connection within a public cloud comprises transmitting a first token and a second token from a cloud service manager to a public cloud controller, initializing a public cloud manager in response to receipt of the first token and the second token, and generate a cloud certificate, and transmitting the cloud certificate and the second token from the public cloud manager to a management plane. The method further comprises establishing a trusted connection between the public cloud controller and the management plane in response to receipt of the cloud certificate and the second token by the management plane.

17 Claims, 4 Drawing Sheets

(51) Int. Cl.
*H04L 29/08* (2006.01)
*H04L 12/24* (2006.01)

(56) References Cited

U.S. PATENT DOCUMENTS

| | | | |
|---|---|---|---|
| 9,426,155 B2* | 8/2016 | Chao | H04L 63/0815 |
| 10,075,459 B1* | 9/2018 | Suryanarayanan | H04L 63/0227 |
| 10,257,163 B2* | 4/2019 | Rotvold | H04L 63/0209 |
| 10,581,829 B1* | 3/2020 | Don | H04L 65/1069 |
| 10,742,629 B2* | 8/2020 | Krauss | G06F 9/445 |
| 10,831,454 B2* | 11/2020 | Pathak | G06F 11/3006 |
| 2011/0004753 A1* | 1/2011 | Gomi | H04L 9/3213 713/156 |
| 2012/0265976 A1* | 10/2012 | Spiers | G06F 9/45533 713/2 |
| 2014/0289855 A1* | 9/2014 | Shulman | H04L 67/2804 726/23 |
| 2014/0331309 A1* | 11/2014 | Spiers | H04L 9/3247 726/12 |
| 2014/0351423 A1* | 11/2014 | Madani | H04L 63/1408 709/224 |
| 2015/0339597 A1* | 11/2015 | Chiu | H04M 1/72566 705/5 |
| 2016/0028550 A1* | 1/2016 | Gaddam | H04L 9/3215 713/173 |
| 2016/0352682 A1* | 12/2016 | Chang | H04L 12/4633 |
| 2017/0026355 A1* | 1/2017 | Mathaiyan | H04L 63/0428 |
| 2017/0026470 A1* | 1/2017 | Bhargava | H04L 67/22 |
| 2017/0099188 A1* | 4/2017 | Chang | H04L 63/20 |
| 2017/0104755 A1* | 4/2017 | Arregoces | H04L 63/102 |
| 2017/0195332 A1* | 7/2017 | Wu | H04L 67/10 |
| 2017/0223005 A1* | 8/2017 | Birgisson | H04L 63/083 |
| 2017/0353495 A1* | 12/2017 | Raghavan | H04L 63/06 |
| 2018/0007034 A1* | 1/2018 | Leggette | G06F 16/172 |
| 2018/0062923 A1* | 3/2018 | Katrekar | H04L 41/0806 |
| 2018/0063193 A1* | 3/2018 | Chandrashekhar | H04L 49/70 |
| 2018/0075009 A1* | 3/2018 | Baryshnikov | H04L 41/18 |
| 2018/0255142 A1* | 9/2018 | Benantar | H04L 63/08 |
| 2020/0084202 A1* | 3/2020 | Smith | H04L 67/28 |
| 2020/0285978 A1* | 9/2020 | Chen | G06N 3/08 |

OTHER PUBLICATIONS

I. Baldin, P. Ruth, C. Wang and J. S. Chase, "The Future of Multi-Clouds: A Survey of Essential Architectural Elements," 2018 International Scientific and Technical Conference Modern Computer Network Technologies (MoNeTeC), Moscow, 2018, pp. 1-13. (Year: 2018).*

Kanewala, Thejaka Amila, et al. "A credential store for multi-tenant science gateways." 2014 14th IEEE/ACM International Symposium on Cluster, Cloud and Grid Computing. IEEE, 2014, pp. 445-454. (Year: 2014).*

* cited by examiner

FIG. 4

SYSTEM AND METHOD FOR AUTHENTICATION IN A PUBLIC CLOUD

RELATED APPLICATIONS

Benefit is claimed under 35 U.S.C. 119(a)-(d) to Foreign Application Serial No. 201841011023 filed in India entitled "SYSTEM AND METHOD FOR AUTHENTICATION IN A PUBLIC CLOUD", on Mar. 26, 2018, by Nicira, Inc., which is herein incorporated in its entirety by reference for all purposes.

TECHNICAL FIELD

The present invention relates to methods and systems for providing authentication in public cloud environments.

BACKGROUND

In many current implementations, to establish logical networks in public clouds, multiple components are required to be deployed and managed. In a public cloud environment, these components are deployed in various public cloud accounts, and typically establishing trusted communication channels between the components requires manual intervention. As public clouds continue to increase in size, the difficulty in establishing trusted communication channels between the components increases.

Hence, there is a need for a system and method that is able to create trusted communication channels without explicit manual intervention from a user administrator.

SUMMARY

In one embodiment, a method for managing a trusted connection within a public cloud comprises transmitting a first token and a second token from a cloud service manager to a public cloud controller, generating a cloud certificate from a public cloud manager in response to receipt of the first token and the second token, and transmitting the cloud certificate and the second token from the public cloud manager to a management plane. The method further comprises establishing a trusted connection between the public cloud controller and the management plane in response to receipt of the cloud certificate and the second token by the management plane.

In another embodiment, a computing device is configured to transmit a first token and a second token from a cloud service manager to a public cloud controller, generate a cloud certificate from a public cloud manager in response to receipt of the first token and the second token, and transmit the cloud certificate and the second token from the public cloud manager to a management plane. The computing device is further configured to establish a trusted connection between the public cloud controller and the management plane in response to receipt of the cloud certificate and the second token by the management plane.

Further embodiments include a non-transitory computer-readable storage medium comprising instructions that cause a computer system to carry out the above method above, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present description provide enhanced computer- and network-based methods and systems for establishing trusted connections between components of a cloud environment. In various embodiments, an administrator deploys a public cloud gateway within a cloud service. In such an embodiment, when the public cloud gateway boots, a cloud service manager needs to communicate with the public cloud gateway through the use of API calls. To allow the cloud service manager to establish a secure and trusted connection with the cloud service, the credentials of a management plane may be communicated to and stored within the cloud service manager. These credentials may be used to generate certificates that are able to authenticate the cloud service manager with the public cloud gateway and the public cloud gateway with the management plane.

Figure 1:
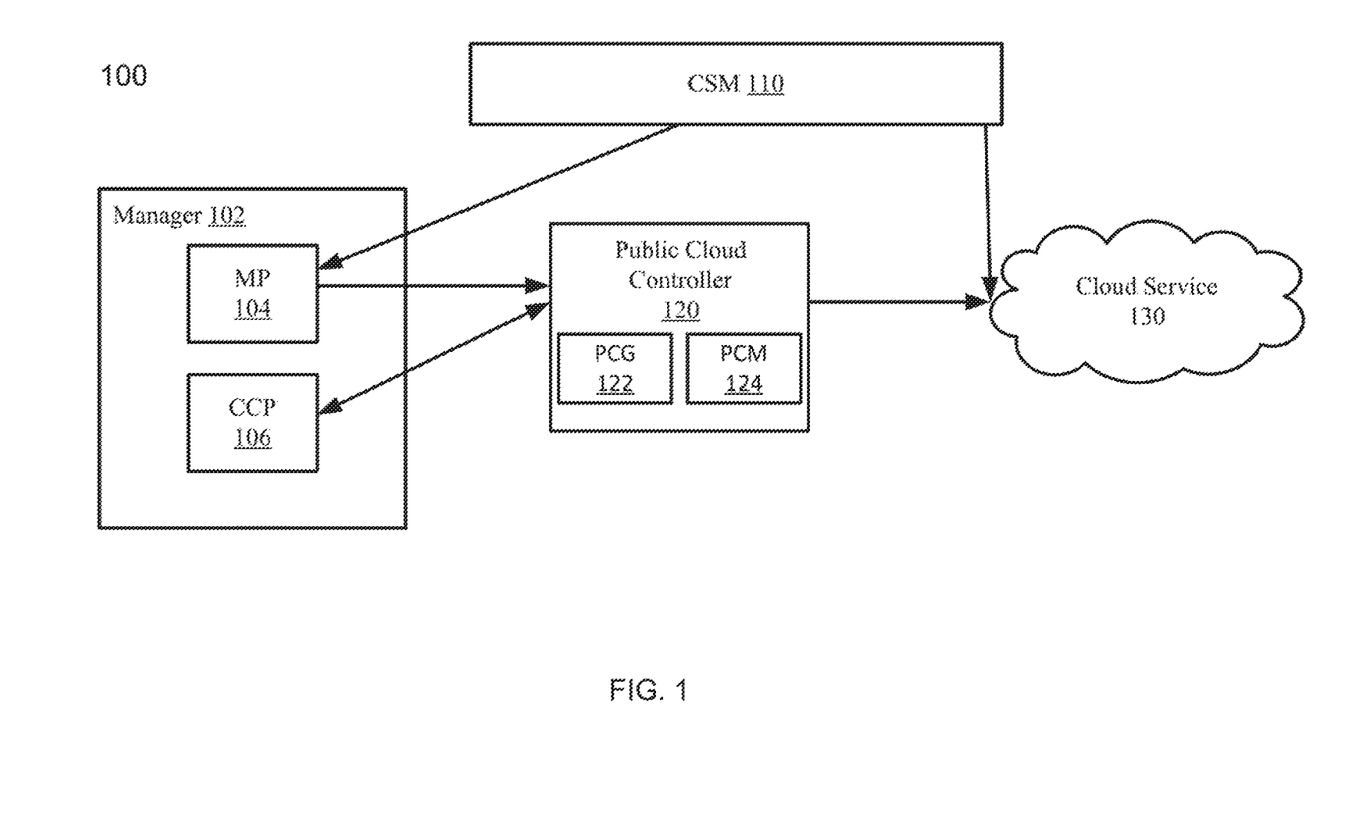
FIG. 1 is an overview block diagram of a network control system, according to one or more embodiments.

FIG. 1 is a block diagram of a network control system 100 including manager 102, cloud service manager (CSM) 110, public cloud controller 120, and cloud service 130. Network control system 100 provides management functions for a public cloud service. Network control system 100 may include one or more processors configured to execute instructions, for example, executable instructions that perform one or more operations described herein. The executable instructions may be stored within one or more memory elements of the network control system 100. As illustrated, the network control system 100 provides cloud service management capabilities to a public cloud environment. While a single cloud service is shown, in various embodiments, multiple cloud services may be managed by CSM 110.

In one embodiment, manager 102 includes management plane (MP) 104 and central control plane (CCP) 106. Though shown as single units, it should be understood that both MP 102 and CCP 106 may be implemented as distributed or clustered systems. That is, MP 102 may include multiple computing devices that implement management plane functions, and a CCP 106 may include multiple computing devices, virtual machines or other virtual computing instances that implement central control plane functions. In one embodiment, manager 102 is a NSX® manager available from VMware, Inc. In various embodiments, manager 102 may include a user interface to allow a user administrator to control the manager 102.

In some embodiments, MP 102 is configured to receive logical network configuration data (e.g., through an application programming interface). Users (e.g., network administrators) may enter configuration data through, e.g., a command-line interface, a graphical user interface, etc. The configuration data is associated with a logical network. The logical network may include logical networking elements, which may be implemented as virtual entities on host machines, such as a logical switch implemented as a virtual switch, a logical router implemented as a virtual router, etc. In various embodiments, the configuration data may include information describing logical entities, such as logical ports (e.g., assigning media access control (MAC) and/or Internet protocol (IP) addresses to the logical ports) for logical networking elements, how logical networking elements are interconnected, various service rules (such as distributed firewall rules) to be enforced at one or more logical networking elements, etc. Each of these pieces of configuration data, including logical networking elements, service rules, rule sets, etc., may be referred to as a logical entity.

In one embodiment, MP 102 receives logical network configuration data and generates desired state data that specifies how the logical network should be implemented in the physical infrastructure. In some embodiments, this data includes a description of the logical networking elements and logical ports in a uniform format (e.g., as a set of database records or another format). When users provide configuration changes (e.g., creating or deleting logical entities, modifying properties of logical entities, changing relationships between logical entities, etc.), the changes to the desired state are distributed as logical network updates.

CCP 104 receives data from MP 102, and is configured to communicate with the public cloud controller 120. In some embodiments, CCP 104 is part of a central control plane cluster, with each controller in the cluster managing a different set of virtual entities.

CSM 110 communicates with manager 102, public cloud controller 120, and cloud service 130. CSM 110 may be configured to provide cloud specific inventory, manage the lifecycle of a customer gateway and upgrade agents within each virtual private cloud (VPC). Further, the CMS 110 may be configured to coordinate with an update coordinator to ensure that the appropriate components are upgraded. For example, the CSM 110 manages upgrades to the CCP 104 and/or MP 102. Further, the CSM 110 may manage upgrades to cloud-specific components.

The CMS 110 provides a user interface (UI) for a cloud administrator to administrate and manage deployment through virtual machine (VM) tagging work-flows. CMS 110 may communicate with manager 102 via the UI.

In various embodiments, the CSM 110 is configured as a multi-cloud deployment, where a single CSM manages many public cloud services. CSM 110 may include a state or states for specific cloud information. For example, the state may include VPC inventory, cloud credentials, cloud accounts, upgrade version management, etc. The CSM 110 may be configured to discover and present VPC for deploying cloud gateways (CGWs). Further, the CSM 110 detects the presence/absence of CGW. In one embodiment, the CSM 110 pushes CGW to requested VPCs, and is configured to management upgrading of CGWs. Further, the CSM 110 may be configured to upgrade or manage upgrades to guest VMs.

Figure 2:
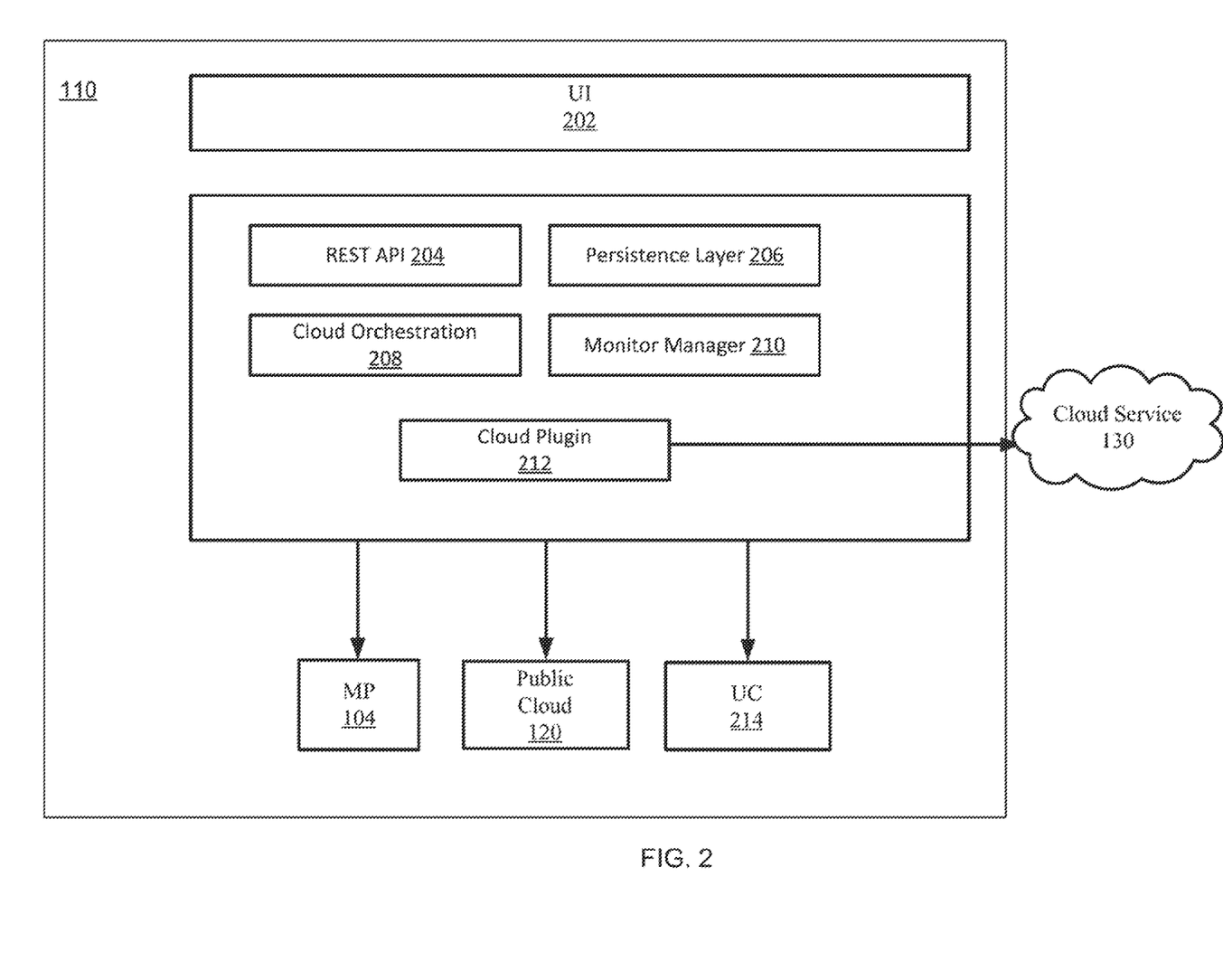
FIG. 2 is an overview block diagram of a cloud service manager, according to one or more embodiments.

FIG. 2 illustrates a high level architecture of CSM 110. In one embodiment, CS 110 includes UI 202, representational state transfer (Rest) API 204, persistence 206, cloud orchestration 208, monitor manager 210, and cloud plugin 212. The CSM 110 is configured to communicate with various different public clouds (cloud service 130), communicate with manager 102, and to orchestrate various workflows within the public clouds.

In one embodiment, UI 202 consists of workflows a cloud administrator will go through to manage operations of the cloud service. For example, UI 202 may allow a cloud administrator to configure cloud specific credentials, manager credentials, and other credentials. UI 202 may be separate from the UI of manager 102, or UI 202 may be part of UI of manager 102 and hosted within manager 102.

In the embodiment where UI 202 is hosted within manager 102, cloud functionality may be directly access via manager 102. A user may be provided with a single plane of access to entire functionality of the cloud service and all management aspects of the cloud service. Such an interface may be advantageous a user may only be required to login within a single UI to gain access to all of the functionality.

In the embodiment where UI 202 is separate from manager 102, cloud specific functionality may be access via UI 202 and management plane functionality may be access via the UI of manager 102. As the UI 202 is decoupled from manager 102, a user may have to log into UI 202 separate from the UI of manager 102. Further, in one embodiment, UI 202 may be configured to manage multiple different cloud services 130.

REST API 204 includes services for providing interoperability between computer systems. REST APIs use HTTP requests (often sent by script or high-level language) as a way of making idempotent remote procedure calls that create, modify, or delete objects defined by the API. A REST API is defined by a collection of XML documents that represent the objects on which the API operates. The HTTP operations themselves are generic to all HTTP clients. To write a RESTful client, you should understand HTTP protocol and the semantics of standard HTML markup. In one embodiment, for a communication protocol using REST API, the set of objects that the API supports and what they represent, how the API represents these objects, and how the client refers to an object. In one embodiment, a client employing a REST API may be configured to create or modify an object or post a request for a new or changed XML document for the object.

Persistence layer 206 is configured to manage a state to be maintained within CSM 110. In one embodiment, the state is a cloud specific state, for example, a cloud specific state may include cloud credentials, the state of the cloud gateway deployment, and/or cloud specific information. In one embodiment, persistence layer 206 may be configured to maintain data in a cloud. Further, the persistence layer 206 may be configured to maintain data within management plane 104. In yet other embodiments, persistence layer 206 may be configured to maintain data within one or more databases.

Cloud orchestration 208 may be configured to handle logic of the workflows within CSM 110. For example, cloud orchestration 208 may be configured for deployment of a gateway within a VPC. Monitor manager 210 interacts with manager 102 and cloud specific components of cloud service 130. The monitor manager 210 may further display a dashboard for all cloud specific components. Further, monitor manager 210 may be configured for Tag management within cloud service 130. Tag management includes tagging objects with metadata to make objects searchable and sortable. Cloud plugin 212 includes or consists of business logic needed to communicate to different cloud services (cloud service 130). For example, cloud plugin 212 may include the necessary business logic to communicate with Amazon Web Services (AWS), Microsoft Azure, or the like.

CSM 110 communicates with MP 104 to receive inventory information, status of public cloud gateway (PCG) 122, receive or transmit status of public cloud manager 124 (PCM), Tag management, and/or validation of cloud service 130.

CSM 110 may be configured to deploy PCG 122 and populate and initialize PCM 124. After PCM 124 is initialized, and during PCG 122 deployment, CSM 110 is configured to initialize the various configurations required by PCM 124. CMS 110 may be configured to transmit cloud account credentials, cloud specific configurations, management credentials, and/or gateway specific credentials to PCM 124. In one embodiment, CMS 110 is configured to initiate task framework of PCM 124 to start all relevant tasks within PCM 124.

In one or more embodiments, CSM 110 is configured to deploy a public cloud gateway per VPC. In such embodiments, the CSM 110 accesses the cloud service to obtain the latest public cloud gateway configuration data and launch a virtual machine with the necessary information. Further, the CSM 110 transmits the manager certification (thumbprint) to the public cloud gateway for authorization.

CSM 110 communicates with upgrade controller (UC) 214 to upgrade the CSM and/or other cloud components. In one embodiment, upgrading the CSM 110 is triggered by UC 214. Further, to manage upgrading of cloud components (e.g., PCM 124, PCG 122, and/or VMs), CSM 110 coordinates with UC 214, interacting with UC 214 during runtime and/or using UC 214 as a library.

With further reference to FIG. 1, public cloud controller 120 communicates with MP 104, CCP 106 and cloud service 130. Public cloud controller 120 includes PCG 122 and PCM 124.

PCG 122 is configured to provide VMs and other components in cloud service 130 with CSM 110 and manager 102. In one embodiment, PCG 122 manages external public IP addresses for a virtual data center and one or more private internal networks interconnecting VMs of cloud service 130. PCG 122 is configured to route traffic incoming to and outgoing from cloud service 130, such as firewalls, network address translation (NAT), dynamic host configuration protocol (DHCP), and load balancing. PCG 122 may be configured to provide virtual private network (VPN) connectivity over a network with another VPN endpoint.

While FIG. 1 depicts a single instance of a public gateway manager 120, PCM 124 and PCG 122, it is recognized that they may represent multiple gateway components. In some embodiments, a separate public gateway manager 120, PCM 124 and PCG 122 may be deployed per cloud service. In some embodiments, a gateway instance may be deployed that manages traffic with a specific tenant, while a separate gateway instance manages public-facing traffic to the Internet. In yet other embodiments, one or more gateway instances are shared among multiple cloud services 130 and may be used to manage traffic incoming and outgoing from cloud service 130.

In one embodiment, PCM 124 is configured to manage and integrate virtualized computing resources provided by cloud computing system 150 with virtualized computing resources of computing system. PCM 124 may be configured to deploy VMs in cloud service 130, transfer VMs from a virtualized computing system to cloud service 130, and perform other "cross-cloud" administrative tasks, as described in greater detail later. In one implementation, PCM 124 is a module or plug-in complement to a virtualization manager, although other implementations may be used, such as a separate computer program executing in a central server or running in a VM.

In one embodiment, PCM 124 is configured to communicate between CSM 110 and cloud service 130. Further, PCM 124 may be configured control network traffic into cloud service 130 via a gateway component (depicted as PCG 122).

Cloud service 130 may be a cloud-based computing service such as Amazon Web Services (AWS), Microsoft Azure, or the like. Cloud service 130 may support layer 3 (L3) routing based on Internet protocol (IP) address. However, the VMs and virtual network entities may be designed based on an assumption of layer 2 (L2) switching based on Media Access Control (MAC) addresses that is common in non-cloud based datacenters. While a single cloud service 130 is illustrated, in various embodiments, more than one cloud service 130 may be utilized.

In various embodiments, cloud service 130 communicates with public cloud controller 120 and CSM 110. In such embodiment, cloud service 130 communicates with public cloud controller 120 and CSM 110 using REST APIs.

Authentication of a cloud service (cloud service 130) may be aided by communication channels between cloud service manager 110, public cloud manager 124 and management plane 104. Cloud service manager 110 is configured to communicate with public cloud manager 124 and management plane 104 and public cloud manager 124 is configured to communicate with management plane 104.

Communication between CSM 110 and management plane 104 is entered manually by an administrator entering credentials of the management plane 104 within CSM 110.

In one or more embodiments, the PCG 122 is booted (initialized) the CSM 110 communicates with the PCG 122 by making API calls to the PCG 122. The API calls may be REST API calls. CSM 110 populates its public key as user data within the PCG 122. CSM 110 additionally communicates a shared secrete as user data within the PCG 122. Further, when the PCG 122 boots up, the CSM 110 makes calls to the PCG 122. A trusted connection is formed between PCG 122 and CSM 110, as PCG 122 has CSM's public key and CSM knows the shared secret provided to PCG 122. In one embodiment, PCG 122 trusts CSM 110, as PCG 122 has CSM's public key obtained from the user data and PCG replies to CSM call with the shared secret and the public key. CSM trusts PCG based on the shared secret and stores the PCG public key for further calls.

A trusted communication may be established between PCG 122 and MP 104 by communicating the PCG public key to the MP 104 when it is received by the PCG 122. Further, CSM 110 shares a thumbprint of MP 104 with PCG 122. When PCG 122 is initiated (booted up), PCG 122 makes calls to MP 104 and a trust is established between PCG 122 and MP 104 based on the thumbprint provided by CSM 110. Further, a trusted communication connection is formed between the PCG 122 and MP 104 as MP 104 receives the PCG certificate from the CSM 110.

Figure 3:
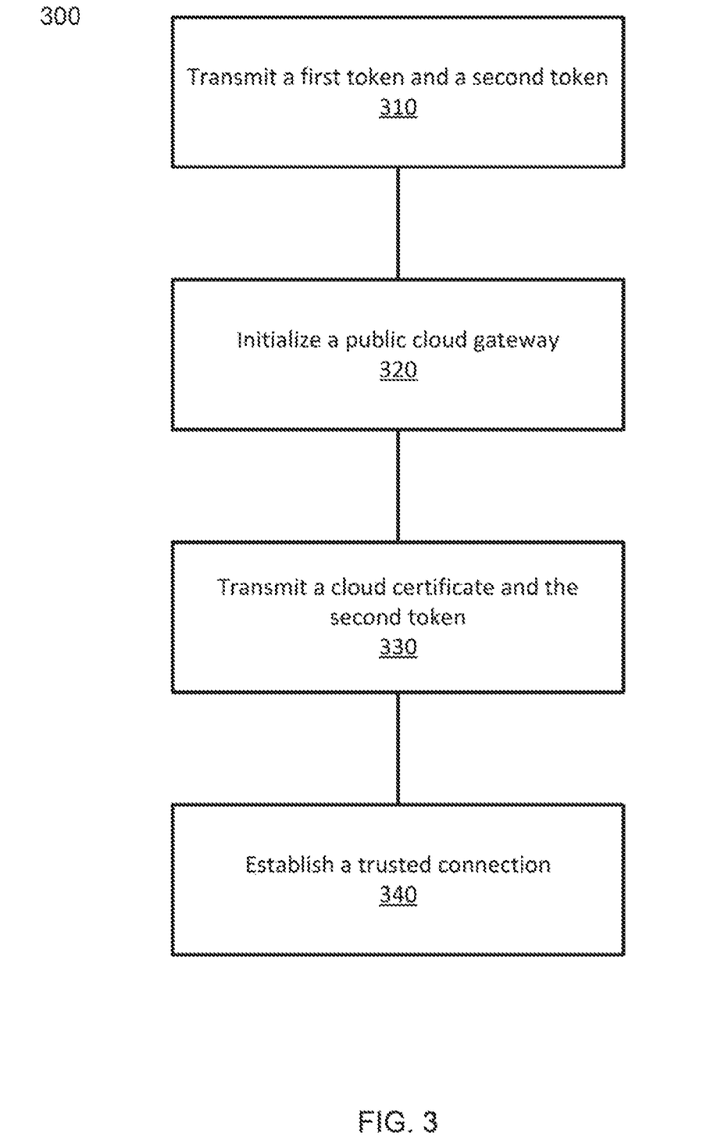
FIG. 3 illustrates an example method of managing a trusted connection within a public cloud according to one or more embodiments.

FIG. 3 illustrates a method 300 for managing a trusted communication connection within a public cloud. At step 310, a first and second token a transmitted from a cloud service manager (CSM 110) to a public cloud controller (public cloud controller 120). In one embodiment, the first token is an authorization token provided by a management plane (MP 102), and the second token is an authorization token provided by a cloud service manager (CMS 110). The first and second tokens may be communicated to the public cloud manager of the public cloud controller. The cloud service manager may further transmit authorization information to the public cloud controller. The authorization information may include user authorization information and/or cloud service manager authorization information.

At step 320, a public cloud manager (PCM 124) is initialized and a cloud certificate is generated in response to receipt of the first token and the second token. The cloud certificate may be generated by the public cloud manager (PCM 124). At step 330, a cloud certificate is transmitted along with the second token from the public cloud manager (PCM 124) to a management plane (MP 102). In one embodiment, a public cloud gateway (PCG 122) in addition to initializing a public cloud gateway (PCG 122).

A trusted connection is established between the public cloud controller and the management plane in response to receipt of the cloud certification and the second token by the management place at step 340. Hence, a trusted connection may be created without requesting additional input from a user. For example, after initiating the connection, a user is not required to enter additional data or have additional interactions with a UI to establish a trusted (secure) connection between a management plane, a cloud service manager and a cloud service.

Further, in one embodiment, user data may be transmitted from the cloud service manager to the public cloud manager. The user data may include a selected VM inventory requests.

In one or more embodiments, a TLS protocol may be used to establish the secure connection. The TLS protocol has two layers, a record protocol, which encapsulates higher-level protocols and handles reliability, confidential and compression of messages exchanged over the connection, and a handshake protocol, which is responsible for setting up a secure channel between participants (PCM, CSM, and/or MP) and providing the keys and algorithm information to the record protocol. Thus, the TLS session provides security features such as identification, authentication, confidentiality and integrity for the communication between the public cloud manager, cloud service manager and/or management plane.

While not illustrated, method 300 may further include generating a management plane (MP 104) certificate in response to receipt of the first token and transmitting the management plane certificate to the cloud service manager (CSM 110). Further, the management plane certificate may be stored within the cloud service manager and the public cloud manager certificate is stored within the management plane (MP 104). Storing the management plane certificate within the cloud service manager and storing the public cloud manager certificate simplifies the deployment of cloud services 130 as the cloud service manager will have the same authentication credentials as the management plane.

Figure 4:
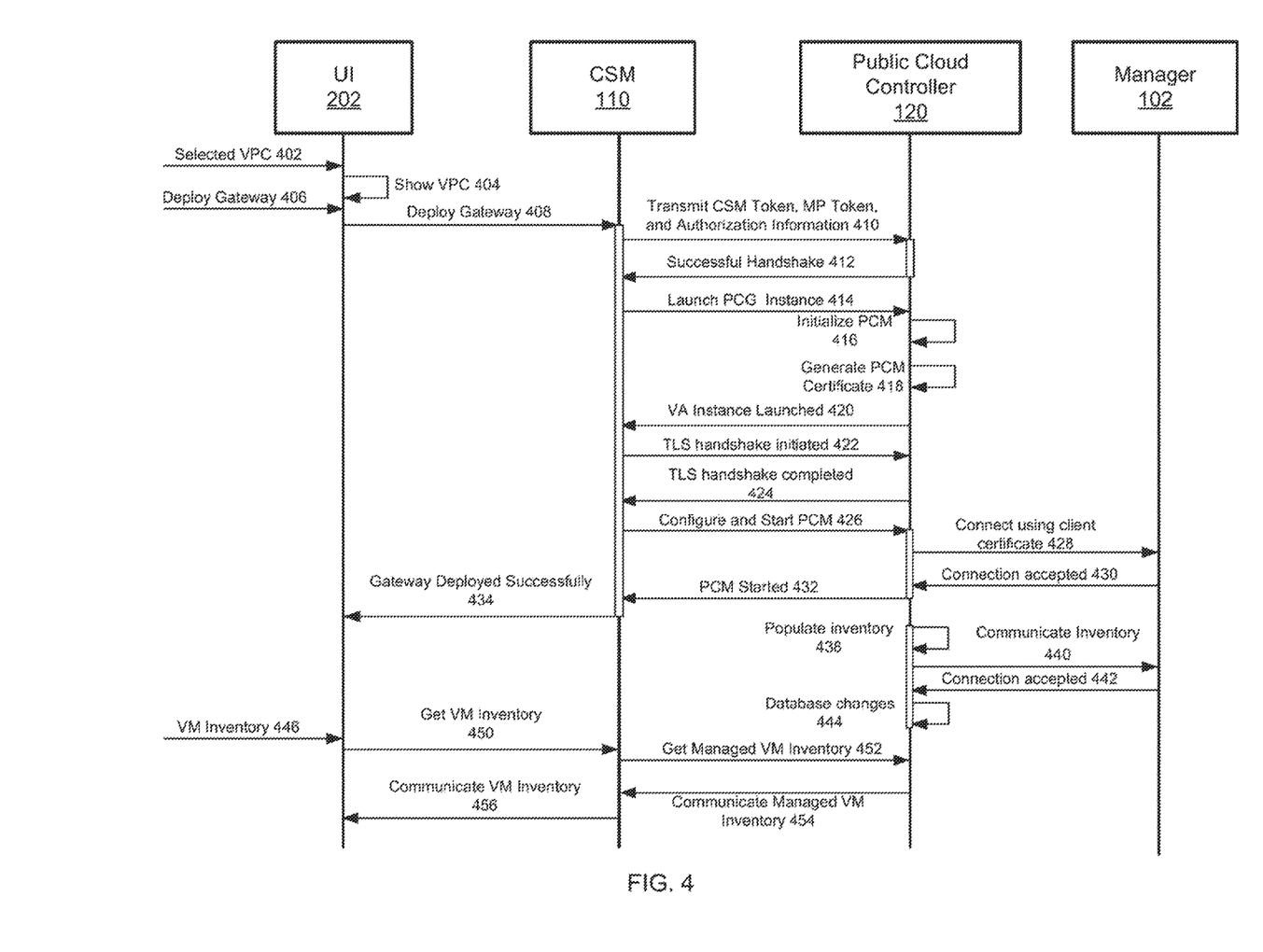
FIG. 4 illustrates a sequence of establishing trusted connections within a public cloud according to one or more embodiments.

FIG. 4 illustrates an interaction sequence between the various components of network control system 100. At 402 a user selects a VPC within UI 202. The VPC is then displayed to the user (404) and the user enters a command to deploy a gateway (406) which is sent to CSM 110 (408). CSM 110 transmits a CSM token, an MP token and authorization information to public cloud controller 120 (410). In one embodiment, the public cloud manager of the public cloud controller 120 receives the tokens and authorization information from the public cloud controller 120. A handshake is initiated between the public cloud controller 120 and the CSM 110, and an indication of a successful handshake is communicated to CSM 110. CSM 110 initiates a public cloud gateway (PCG 122) instance within public cloud controller 120 at 414. Further, a public cloud manager is initialized at 416 within public cloud controller 120. After the public cloud manager is initialized, a public cloud certificate is generated (418).

At 420 a virtual appliance (VA) instance is launched within CSM 110. The VA instance may be used to create a VM within a cloud service (cloud service 130). In one embodiment, the VA may be an Amazon Machine Image (AMI). A TLS handshake is initiated and completed between public cloud controller 120 and CSM 110 (422 and 424). After the TLS handshake is completed, the CSM 110 configures and starts the public cloud manager (426). The public cloud controller 120 connects with the manager 102 using a client certificate (428). In one embodiment, the public cloud manager 124 connects with management plane 104 with the client certificate. An indication is provided by the manager 102 to public cloud controller 120 that the connection was accepted 430. In one embodiment, the management plane 104 communicates an indication that the connection was accepted to public cloud manager 124.

An indication that the public cloud manager was initiated is transmitted from the public cloud controller 120 (or the public cloud manger) to the CSM 110 (432) and an indication of a successful deployment of the gateway is transmitted from CSM 110 to UI 202 (434). Public cloud controller populates inventory at 438 and communicates the inventory to manager 102 (management plane 104) at 440 and an indication of a successful communication is provided from the manager 102 to public cloud controller 120 (442). Database changes are initiated at 444. These changes may include nestdb changes.

VM inventory request are entered via UI 202 at 446 and communicated to CSM 110 at 450 and then to public cloud controller at 452. The managed VM inventory is then communicated to CSM 110 from public cloud controller 120 at 454 and then to UI 202 from CSM 110 at 456.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for managing trusted connections within a public cloud, the method comprising:
    transmitting a first token and a second token from a cloud service manager to a public cloud controller, the first token provided to the cloud service manager by a management plane, and the second token provided by the cloud service manager;
    in response to receipt of the first token and the second token:
        initializing, by the cloud service manager, a public cloud gateway and a public cloud manager of the public cloud controller, and
        generating, by the public cloud manager, a cloud certificate;
    transmitting the cloud certificate and the second token from the public cloud manager to the management plane; and
    establishing a trusted connection between the public cloud controller and the management plane in response to receipt of the cloud certificate and the second token by the management plane.

2. The method of claim 1, further comprising transmitting cloud service manager authorization information from the cloud service manager to the public cloud controller, wherein the second token includes the transmitted cloud service manager authorization information.

3. The method of claim 1, further comprising transmitting user data from the cloud service manager to the public cloud gateway.

4. The method of claim 1, further comprising:
    establishing the trusted connection between the public cloud gateway of the public cloud controller and the management plane by communicating a public key from the public cloud gateway to the management plane, wherein the public key is populated by the cloud service manager within the public cloud gateway.

5. The method of claim 1, further comprising:
    providing an indication of successful initialization from the public cloud manager to the cloud service manager.

6. The method of claim 1, further comprising:
    generating a management plane certificate in response to receipt of the first token;
    transmitting the management plane certificate to the cloud service manager;
    storing the management plane certificate within the cloud service manager; and
    storing the cloud certificate within the management plane.

7. A computing device, comprising:
    a memory; and
    a processor communicatively coupled to the memory, the processor configured to:
        transmit a first token and a second token from a cloud service manager to a public cloud controller, the first token provided to the cloud service manager by a management plane, and the second token provided by the cloud service manager;
        in response to receipt of the first token and the second token:
            initialize, by the cloud service manager, a public cloud gateway and a public cloud manager of the public cloud controller, and
            generate, by the public cloud manager, a cloud certificate;
        transmit the cloud certificate and the second token from the public cloud manager to the management plane; and
        establish a trusted connection between the public cloud controller and the management plane in response to receipt of the cloud certificate and the second token by the management plane.

8. The computing device of claim 7, wherein the processor is further configured to transmit cloud service manager authorization information from the cloud service manager to the public cloud controller, wherein the second token includes the transmitted cloud service manager authorization information.

9. The computing device of claim 7, wherein the processor is further configured to transmit user data from the cloud service manager to the public cloud gateway.

10. The computing device of claim 7, wherein the processor is further configured to establish the trusted connection between the public cloud gateway of the public cloud controller and the management plane by communicating a public key from the public cloud gateway to the management plane, wherein the public key is populated by the cloud service manager within the public cloud gateway.

11. The computing device of claim 7, wherein the processor is further configured to:
provide an indication of successful initialization from the public cloud manager to the cloud service manager.

12. The computing device of claim 7, further configured to:
generate a management plane certificate in response to receipt of the first token;
transmit the management plane certificate to the cloud service manager;
store the management plane certificate within the cloud service manager; and
store the cloud certificate within the management plane.

13. A non-transitory computer-readable storage medium containing instructions for controlling a computer processor to:
transmit a first token and a second token from a cloud service manager to a public cloud controller, the first token provided to the cloud service manager by a management plane, and the second token provided by the cloud service manager;
in response to receipt of the first token and the second token:
initialize, by the cloud service manager, a public cloud gateway and a public cloud manager of the public cloud controller, and
generate, by the public cloud manager, a cloud certificate;
transmit the cloud certificate and the second token from the public cloud manager to the management plane; and
establish a trusted connection between the public cloud controller and the management plane in response to receipt of the cloud certificate and the second token by the management plane.

14. The non-transitory computer-readable storage medium of claim 13, wherein the instructions further control the computer processor to transmit cloud service manager authorization information from the cloud service manager to the public cloud manager, wherein the second token includes the transmitted cloud service manager authorization information.

15. The non-transitory computer-readable storage medium of claim 13, wherein the instructions further control the computer processor to establish the trusted connection between the public cloud gateway of the public cloud controller and the management plane by communicating a public key from the public cloud gateway to the management plane, wherein the public key is populated by the cloud service manager within the public cloud gateway.

16. The non-transitory computer-readable storage medium of claim 13, wherein the instructions further control the computer processor to:
provide an indication of successful initialization from the public cloud gateway to the cloud service manager.

17. The non-transitory computer-readable storage medium of claim 13, wherein the instructions further control the computer processor to:
generate a management plane certificate in response to receipt of the first token;
transmit the management plane certificate to the cloud service manager;
store the management plane certificate within the cloud service manager; and
store the cloud certificate within the management plane.

* * * * *